(12) United States Patent
Motiian et al.

(10) Patent No.: US 11,436,865 B1
(45) Date of Patent: Sep. 6, 2022

(54) FINDING SIMILAR PERSONS IN IMAGES

(71) Applicant: Adobe Inc., San Jose, CA (US)

(72) Inventors: Saeid Motiian, San Francisco, CA (US); Zhe Lin, Fremont, CA (US); Shabnam Ghadar, Menlo Park, CA (US); Baldo Faieta, San Francisco, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/207,178

(22) Filed: Mar. 19, 2021

(51) Int. Cl.
*G06V 40/16* (2022.01)
*G06K 9/62* (2022.01)
*G06V 30/194* (2022.01)
*G06V 40/10* (2022.01)

(52) U.S. Cl.
CPC ......... *G06V 40/172* (2022.01); *G06K 9/6296* (2013.01); *G06V 30/194* (2022.01); *G06V 40/10* (2022.01)

(58) Field of Classification Search
CPC .... G06V 40/172; G06V 40/10; G06V 30/194; G06K 9/6296
See application file for complete search history.

(56) References Cited

U.S. PATENT DOCUMENTS

| | | | |
|---|---|---|---|
| 2015/0186741 A1* | 7/2015 | Honjo | G06V 10/42 382/199 |
| 2020/0380299 A1* | 12/2020 | Hu | G06K 9/6218 |
| 2021/0326393 A1* | 10/2021 | Aggarwal | G06N 3/0454 |
| 2022/0101646 A1* | 3/2022 | McDonald | G06V 10/993 |

OTHER PUBLICATIONS

Sadovnik et al. (Finding your Lookalike: Measuring Face Similarity Rather than Face Identity) 2018 (Year: 2018).*

* cited by examiner

*Primary Examiner* — Edward F Urban
*Assistant Examiner* — Wassim Mahrouka
(74) *Attorney, Agent, or Firm* — Nicholson De Vos Webster & Elliott LLP

(57) ABSTRACT

Embodiments are disclosed for finding similar persons in images. In particular, in one or more embodiments, the disclosed systems and methods comprise receiving an image query, the image query including an input image that includes a representation of a person, generating a first cropped image including a representation of the person's face and a second cropped image including a representation of the person's body, generating an image embedding for the input image by combining a face embedding corresponding to the first cropped image and a body embedding corresponding to the second cropped image, and querying an image repository in embedding space by comparing the image embedding to a plurality of image embeddings associated with a plurality of images in the image repository to obtain one or more images based on similarity to the input image in the embedding space.

20 Claims, 14 Drawing Sheets

FINDING SIMILAR PERSONS IN IMAGES

BACKGROUND

Technical Field

The present disclosure relates generally to systems and method for finding similar persons in images. More specifically, one or more embodiments of the present disclosure relate to systems and methods that use machine learning techniques to learn to generate similar embeddings for people with similar attributes represented in image data and use this knowledge to search an image library for similar persons based on those attributes.

Background and Relevant Art

Recent years have seen a rapid proliferation in the use of digital images. Indeed, advances in both hardware and software have increased the ability of individuals to capture, create, edit, search, and share digital images. For instance, the hardware on most modern computing devices (e.g., servers, desktops, laptops, tablets, and smartphones) enables digital image editing and sharing without significant processing delays. Similarly, improvements in software enable individuals to modify, search, share, or otherwise utilize digital images.

With the increased use of digital images has come an increased need for more and better ways of searching through digital images based on what is depicted in these images. In particular, there is a need to identify people in digital images. Existing machine learning techniques perform reasonably well at identifying the same person across multiple images. For example, current datasets typically include images of a person at different ages, from different angles, etc. These datasets are then used to train a model to identify whether a person depicted in an input image is found in a set of images being queried. Typically, the face of the queried person is cropped and provided to the model. The model then processes a set of images to determine whether that same person appears in any of the images. If the same person is found in an image then it is returned, otherwise the model ignores any images that do not include a depiction of the queried person. However, current models do not perform well when tasked to find images of similar, but not identical, people who share one or more attributes.

These and other problems exist with regard to searching digital visual media.

BRIEF SUMMARY

Introduced here are techniques/technologies that enable finding similar persons in images. In particular, in one or more embodiments, the disclosed systems and methods comprise an image search system that receives an input query image that includes a visual representation of a person. The image search system crops this input image into a face crop that focuses on the person's face and a body crop that focuses on the entire person (e.g., as much of the person's body as is depicted in the image). These crops are then provided to corresponding machine learning models that have been trained using contrastive learning techniques to produce image embeddings that are similar for similar images. For example, a face model is trained on face data and produces face embeddings, and a body model is trained on body data and produces body embeddings. The contrastive training techniques minimize a loss function (such as a Normalized Temperature-scaled Cross Entropy loss function) which results in maximizing the agreement between embeddings produced from similar input images.

The face embedding and body embedding are combined into a person embedding which is then used to search an image repository. For example, a stock image repository includes a plurality of images, including images that depict people. Offline, the same face and body models are used to generate person embeddings for each image in the image repository that includes a depiction of a person. At run time, when a query image is received a person embedding is generated for the query image. This person embedding is then compared to the person embeddings of the images in the image repository. A distance metric, such as L2 distance, is used to identify the closest images in the image repository to the input image, based on their respective person embeddings. The resulting images are then returned to the user, such as in the form of a ranked list according to their similarity.

Additional features and advantages of exemplary embodiments of the present disclosure are set forth in the description which follows, and in part are obvious from the description, or are learnable by the practice of such exemplary embodiments.

BRIEF DESCRIPTION OF THE DRAWINGS

The detailed description is described with reference to the accompanying drawings in which.

DETAILED DESCRIPTION

Figure 1:
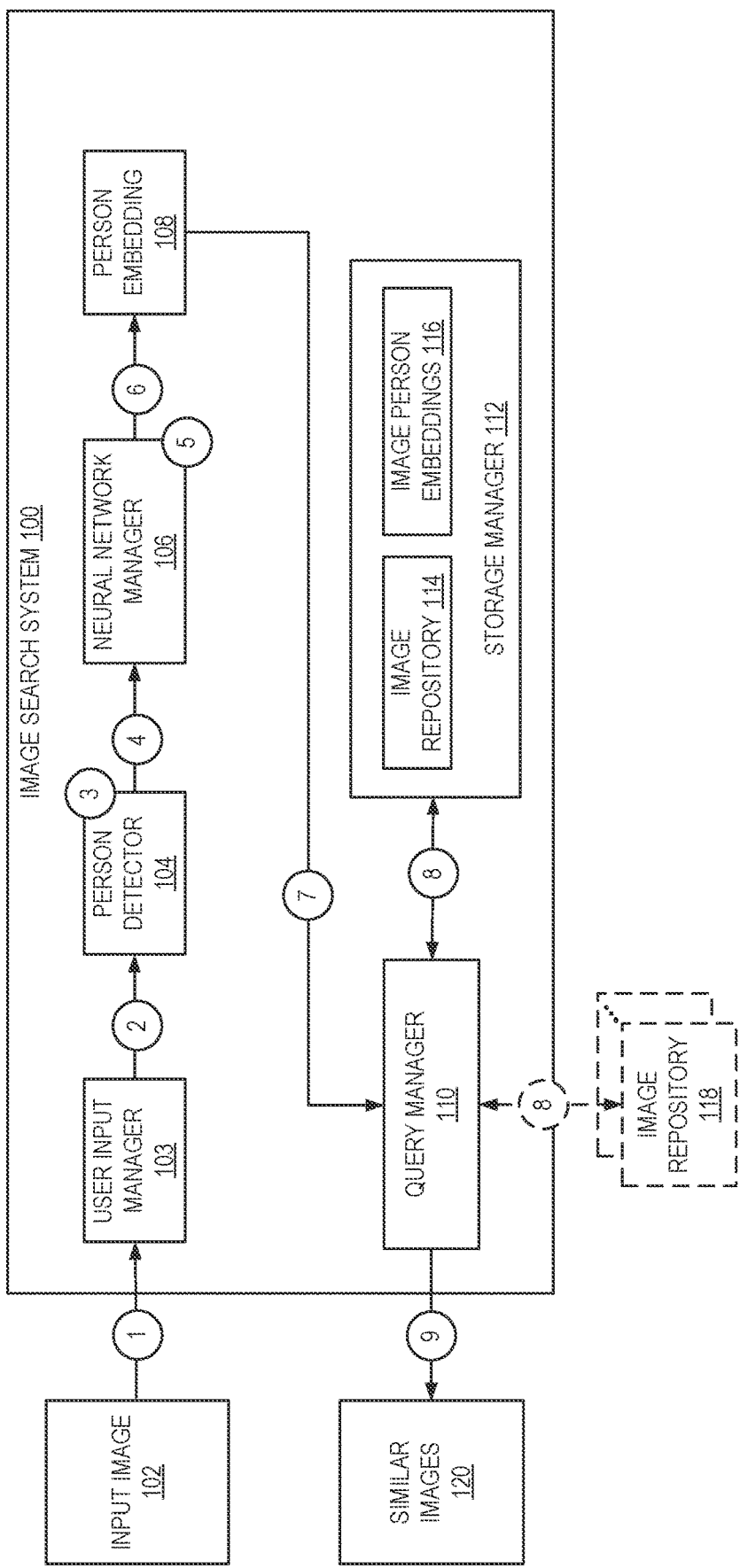
FIG. 1 illustrates a diagram of finding similar persons in images, in accordance with one or more embodiments.

One or more embodiments of the present disclosure include an image search system that uses machine learning to learn to identify similar persons (e.g., persons sharing one or more attributes such as age, ethnicity, gender, etc.) in image data. Prior techniques typically focus on faces and are trained to identify the same person in different images. While these techniques perform reasonably well at identifying the same person, they do not reliably identify images that include similar people. For example, training datasets are typically built for identifying the same person. This means that these datasets include different images of the same person at, for example, different ages, different angles, or other image augmentations. Additionally, the loss functions used when training such techniques introduce a hard threshold such that when an image does not include the same person it is ignored. As a result, the models do not learn to identify similar people, but only identical people.

The inability of such prior techniques to reliably identify similar people leads to a poor user experience when applied to searching for images. For example, if a user searches an image repository for similar images to a query image, they are then presented with search results that often include varying ages, genders, and ethnicities (among other attributes). This in turn requires the user to manually sort through the image results to find an image that is appropriate for their query.

Embodiments address these issues with prior techniques through improved machine learning techniques that train a machine learning model to identify similar persons in images. For example, contrastive learning is used to train a machine learning model to maximize the agreement between similar input images. In particular, during training a loss function (such as a normalized temperature-scaled cross entropy loss function) is used which results in a smoother embedding space, where images of similar, but not identical people, result in embeddings that are close in the embedding space. In some embodiments, multiple models are used to generate an embedding for a given image. For example, a face model is trained specifically on face image data and a body model is trained on body image data. The face model and body model both share the same model architecture and differ in the training data used for their training. The face model processes an image of a person's face and produces a face embedding, while the body model processes an image of a person's body and generates a body embedding. These embeddings are combined into a single person embedding. The person embedding allows an image repository to be searched for similar persons based on a person's face and body features.

When a query image is received, a face crop and a body crop of the query image are generated and passed to the face model and body model, respectively. The resulting face embedding and body embedding are then combined to form a person embedding. An image repository, such as a stock image repository or other repository, includes a plurality of images, at least some of which include representations of persons. In some embodiments, the images that include representations of persons are associated with their own person embeddings that were generated offline. The person embedding generated from the query image is then compared to the person embeddings for images in the image repository. For example, a similarity metric is calculated that indicates how close the query image's person embedding is to the person embeddings associated with repository images in embedding space. Images are then returned based on how similar the embeddings are to the query image's person embedding. This results in improved query results that rank more similar images more highly than less similar images, making it easier to identify the images that are relevant to the user's query.

Term Definitions

As used herein, the term "image" or "digital image" refers to a digital graphics file that when rendered displays one or more objects. In particular, the term "image" comprises a digital file that, when rendered, includes visual representations of one or more objects, such as a person. For example, the term "digital image" includes, but is not limited to, digital files with the following file extensions: JPG, TIFF, BMP, PNG, RAW, or PDF. Thus, a digital image includes digital data or a digital file for an image that is displayable via a graphical user interface of a display of a computing device.

The term "machine learning," as used herein, refers to the process of constructing and implementing algorithms that learn from and make predictions on data. In general, machine learning operates by building models from example inputs (e.g., training), such as a training image data set, to make data-driven predictions or decisions. In some example embodiments, machine learning is used for classification, object localization, object segmentation, or other tasks.

As used herein, the term "neural network" refers to a machine learning model that is tuned (e.g., trained) based on inputs to approximate unknown functions. In particular, the term neural network includes a model of interconnected neurons that communicate and learn to approximate complex functions and generate outputs based on a plurality of inputs provided to the model. For instance, the term neural network includes one or more machine learning algorithms. In particular, the term neural network includes deep convolutional neural networks (i.e., "CNNs"). In addition, a neural network is an algorithm (or set of algorithms) that implements deep learning techniques that utilize a set of algorithms to model high-level abstractions in data.

As used herein, the term "image embedding" refers to refers to a continuous vector representation of an image input to a neural network. Image embeddings include, but are not limited to "face embeddings," "body embeddings," and "person embeddings." As described herein, face embeddings are image embeddings generated by a neural network that has been trained on face image data and body embeddings are image embeddings generated by a neural network that has been trained on body image data. In some embodiments, the face image data includes images that have been cropped to primarily include a person's face, and body image data include images that have been cropped to primarily include a person's body (which may or may not include their face). A person embedding is then created by combining the face embedding and the body embedding, as discussed further herein.

Referring now to the figures, FIG. 1 illustrates a diagram of finding similar persons in images in accordance with one or more embodiments. As shown in FIG. 1, in one or more embodiments, an input image is received by an image search system 100, as shown at numeral 1. For example, input image 102 is a digital file that includes a representation of one or more persons. Any given person is associated with a variety of attributes, such as age, ethnicity, sex, etc. The input image 102 is received by user input manager 103. user input manager 103 allows users to provide input to the image search system. For example, the user input manager 103 allows users to provide an input image 102 and request that similar images be found. The similar images include images that depict at least one person having shared or similar attributes to the person depicted in the input image 102.

User input manager 103 provides the input image to person detector 104 at numeral 2. Person detector 104 crops one or more portions of the input image that correspond to the representation of the person being queried, at numeral 3. In some embodiments, the person detector 104 is a machine learning model trained to detect faces in an input image. For example, if a single person is represented in the image then the face detector detects a single face, if multiple persons are represented in the image then the face detector detects multiple faces. Additionally, or alternatively, the person detector 104 is a machine learning model trained to detect larger portions of a person or persons, such as all or a portion of the person's body.

The person detector generates one or more cropped images that include the face or body of the person depicted in input image 102 and provides them to neural network manager 106 at numeral 4. In some embodiments, neural network manager includes one or more neural networks. For example, a neural network includes a machine-learning model that has been tuned (e.g., trained) based on training input to approximate unknown functions. In particular, a neural network includes a model of interconnected digital neurons that communicate and learn to approximate complex functions and generate outputs based on a plurality of inputs provided to the model. For instance, the neural network includes one or more machine learning algorithms. In other words, a neural network is an algorithm that implements deep learning techniques, i.e., machine learning that utilizes a set of algorithms to attempt to model high-level abstractions in data.

In this example, neural network manager 106 includes a machine learning model that has been trained to generate an embedding that represents the input it receives. In some embodiments, as discussed further below, the model is trained using contrastive learning techniques. The model generates an embedding that represents the cropped portion of the input image, at numeral 5. An embedding is a continuous vector representation of the input to a neural network. In some embodiments, where the cropped portion of the input image is of a person's face, the embedding is a face embedding. Alternatively, where the cropped portion of the input image is of a person's body (which may include the person's face), then the embedding is a body embedding. As discussed further below, in some embodiments, multiple neural networks are used in parallel to process different cropped portions of the input image, each producing a different embedding representing the portion of the input image that was processed. For example, one neural network processes face crops and produces face embeddings, while a second neural network processes body crops and produces body embeddings from the same input image. At numeral 6, these embeddings are concatenated to produce person embedding 108.

Person embedding 108 is a concatenation of multiple embeddings (e.g., a face embedding and a body embedding). The person embedding 108 is used to search for digital images that depict similar persons. For example, at numeral 7, the person embedding 108 is provided to query manager 110. As shown, the image search system 100 includes a query manager 110 which receives the person embedding 108 generated for input image 102. At numeral 8, the query manager uses the person embedding 108 to search image repository 114 stored in storage manager 112 that depict persons who share one or more attributes with the person depicted in the input image. In some embodiments, if the input image includes representations of multiple people, the user selects, or is prompted to select, one to be used to search for similar persons. For example, in some embodiments, if the person detector identifies more than one person in the input image, then the user is prompted to select one for searching. In such an example, a person embedding is generated for the selected person and provided to query manager 110. The query manager 110 compares the person embedding 108 to person embeddings 116 that have been generated for the images in image repository 114. For example, a distance metric, such as L1 or L2 distance metrics, are used to identify images that are "close" to the input image 102 in the embedding space. In some embodiments, the image repository or repositories being search include image repository 114 maintained by image search system 100 and/or may include external image repository or repositories 118 (e.g., accessible over one or more networks, such as the Internet). In some embodiments, the image repository includes a stock image repository, such as available from Adobe® Stock.

At numeral 9, the image search system 100 returns a set of similar images 120 that include a representation of at least one person who is "close" to the person depicted in the input image 102 in the high-dimensional embedding space. In some embodiments, this is returned as a ranked list of images from the repository, ranked in descending or ascending order of "closeness" in the embedding space and/or may include those images which are within a threshold distance of the input image in the embedding space.

Figure 2:
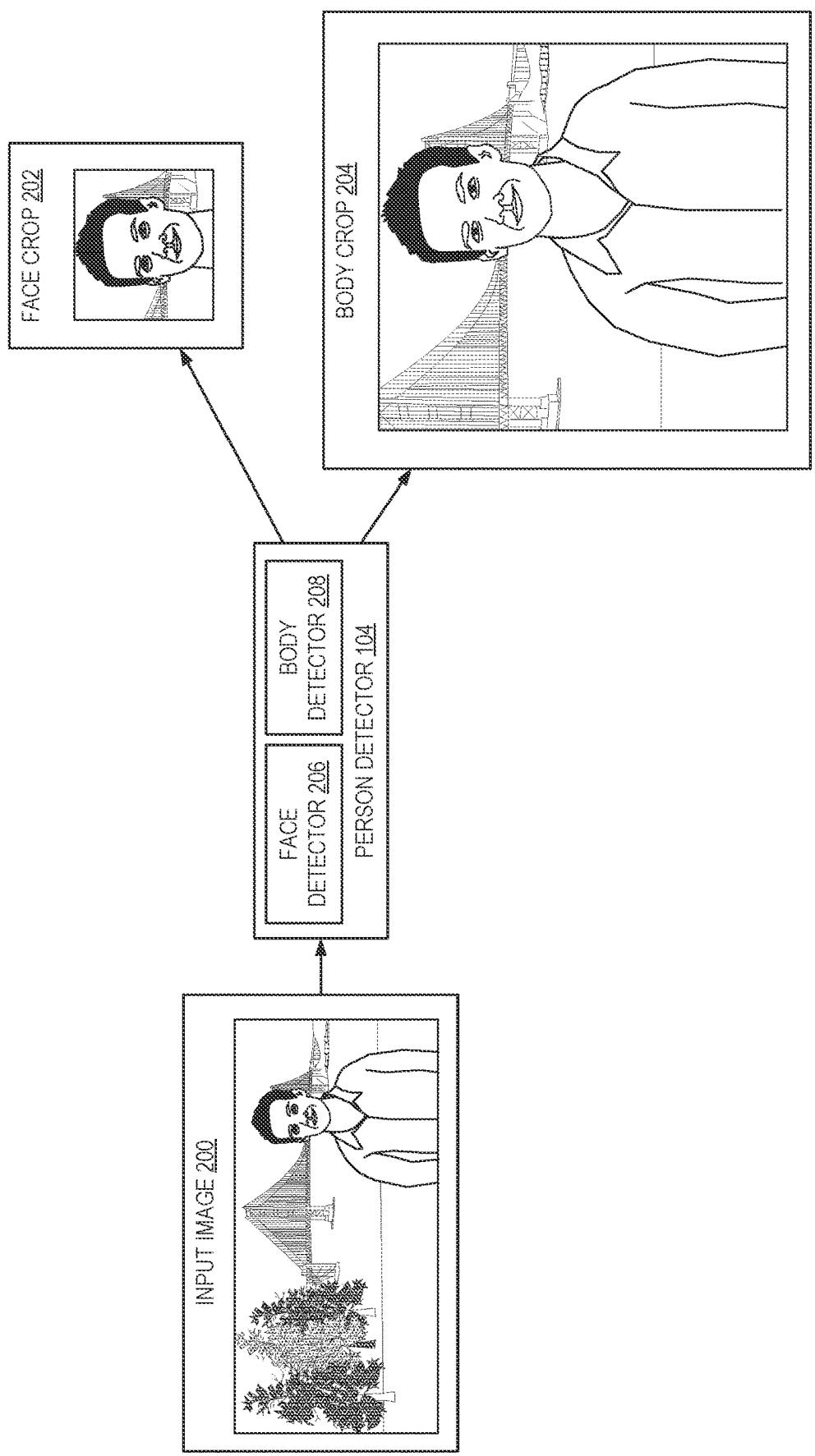
FIG. 2 illustrates a diagram of a person detector, in accordance with one or more embodiments.

FIG. 2 illustrates a diagram of a person detector, in accordance with one or more embodiments. As shown in FIG. 2, an input image 200 is received by person detector 104. In this example, input image 200 includes a representation of a person in front of a bridge. Person detector 104 then generates two cropped images: face crop 202 and body crop 204. Although the example of FIG. 2 is discussed with respect to an input image that includes a representation of one person, in other embodiments an input image having representations of multiple persons is similarly processed into multiple face crops and body crops. In some embodiments, person detector 104 includes one or more object detectors, such as face detector 206 and body detector 208, which are machine learning models trained to identify objects within an input image. For example, face detector 206, in some embodiments, is a machine learning model trained to detect faces. When presented with an input image, face detector 206 generates a bounding box corresponding to a region of the input image that the face detector 206 determines is likely to include a face. This bounding box is then used to crop the input image to produce face crop 202. Likewise, body detector 208, in some embodiments, is a machine learning model trained to detect persons as a whole, rather than only faces. When given input image 200, body detector 208 determines a bounding box corresponding to a region of the input image that the body detector determines is likely to include a person. This bounding box is then used to generate body crop 204. Although machine learning approaches are described with respect to generating face crop 202 and body crop 204, in some embodiments alternative techniques are used. For example, in some embodiments, the user is prompted to identify the face and body depicted in the input image manually by drawing bounding boxes on the input image through a user interface.

Figure 3:
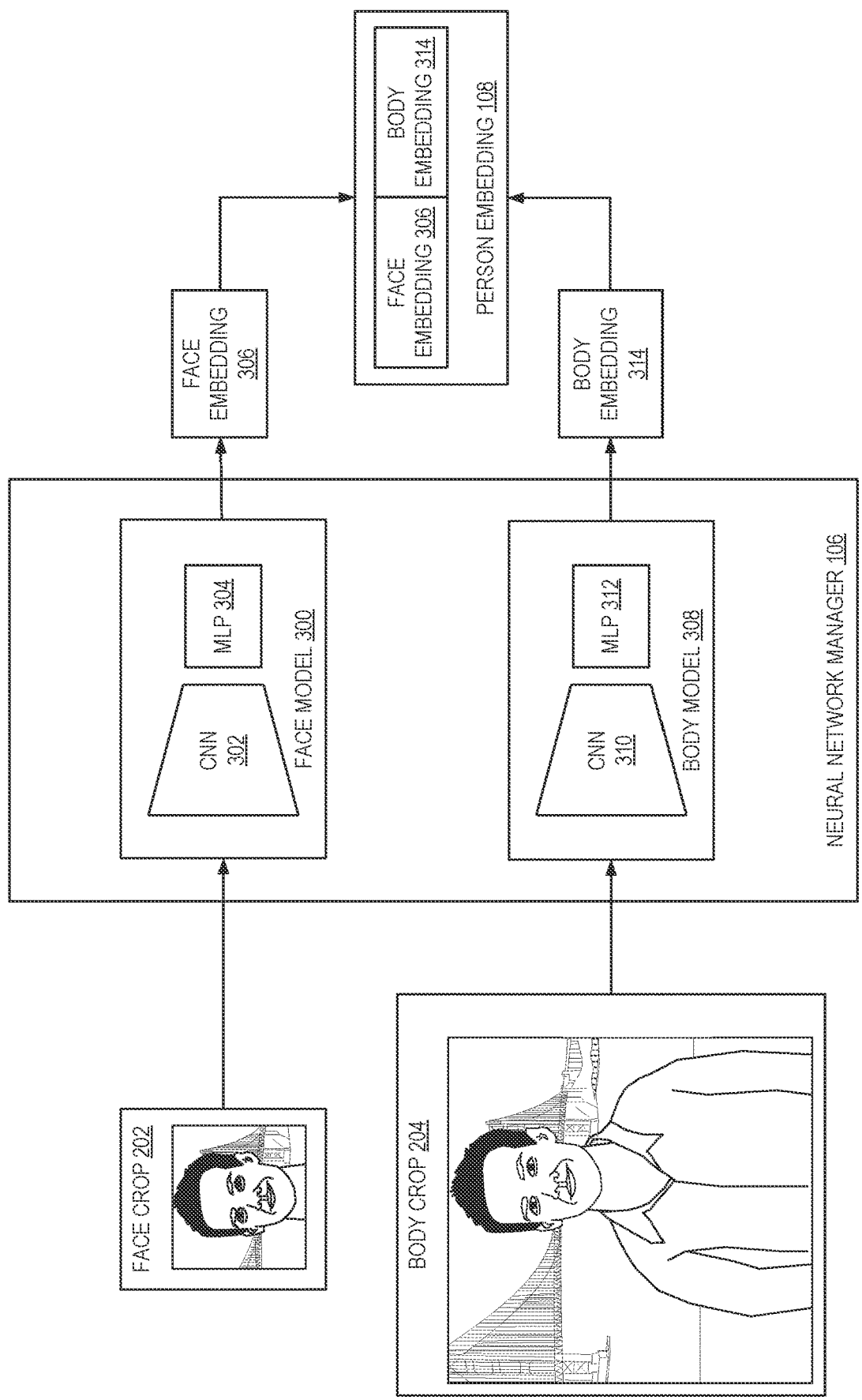
FIG. 3 illustrates a diagram of an example of generating a person embedding, in accordance with one or more embodiments.

FIG. 3 illustrates a diagram of an example of generating a person embedding, in accordance with one or more embodiments. As discussed, in some embodiments, neural network manager 106 includes one or more models, such as face model 300 and body model 308. In some embodiments, each model shares an architecture. For example, face model 300 includes a convolutional neural network (CNN) 302 and a multilayer perceptron (MLP) 304. Similarly, body model 308 includes CNN 310 and MLP 312. In the example of FIG. 3, CNN 302 and CNN 310 are implementable using various network architectures. In one embodiment, CNN 302 and CNN 310 are implemented using a ResNet architecture. CNN 302 extracts a feature representation of the face crop 200 and passes the feature representation to MLP 304. MLP is a neural network which maps the feature representation to an embedding space to generate face embedding 306. Similarly, CNN 310 extracts a feature representation of body crop 202 and passes the feature representation to MLP 312. MLP 312 then maps the feature representation to the embedding space to generate body embedding 314.

As discussed further below, CNN 302 and MLP 304 are trained using contrastive learning techniques to maximize agreement on training pairs of images that each include a representation of a person's face. Similarly, CNN 310 and MLP 312 are trained using the same contrastive learning techniques to maximize agreement on training pairs of images that include representations of a person's body. Although the example of FIG. 3 includes two models, in some embodiments more or fewer models are used. For example, only the face model is used in some embodiments, while in alternative embodiments only the body model is used. Alternatively, in addition to the face model and the body model one or more additional models that capture other views of a person are used.

Once the face embedding 306 and the body embedding 314 have been obtained, these embeddings are combined to form person embedding 108. In some embodiments, face embedding 306 and body embedding 314 are combined by concatenating them together. As discussed, once a person embedding has been obtained for the input image, the person embedding is compared to previously calculated person embeddings corresponding to a plurality of images in an image library (such as a stock image library or other image repository). The image(s) having corresponding person embedding(s) that are closest to the query person embedding in the embedding space (e.g., based on L1 or L2 distance) are then returned to the user. These images include representations of persons having similar attributes to the input image.

Figure 4:
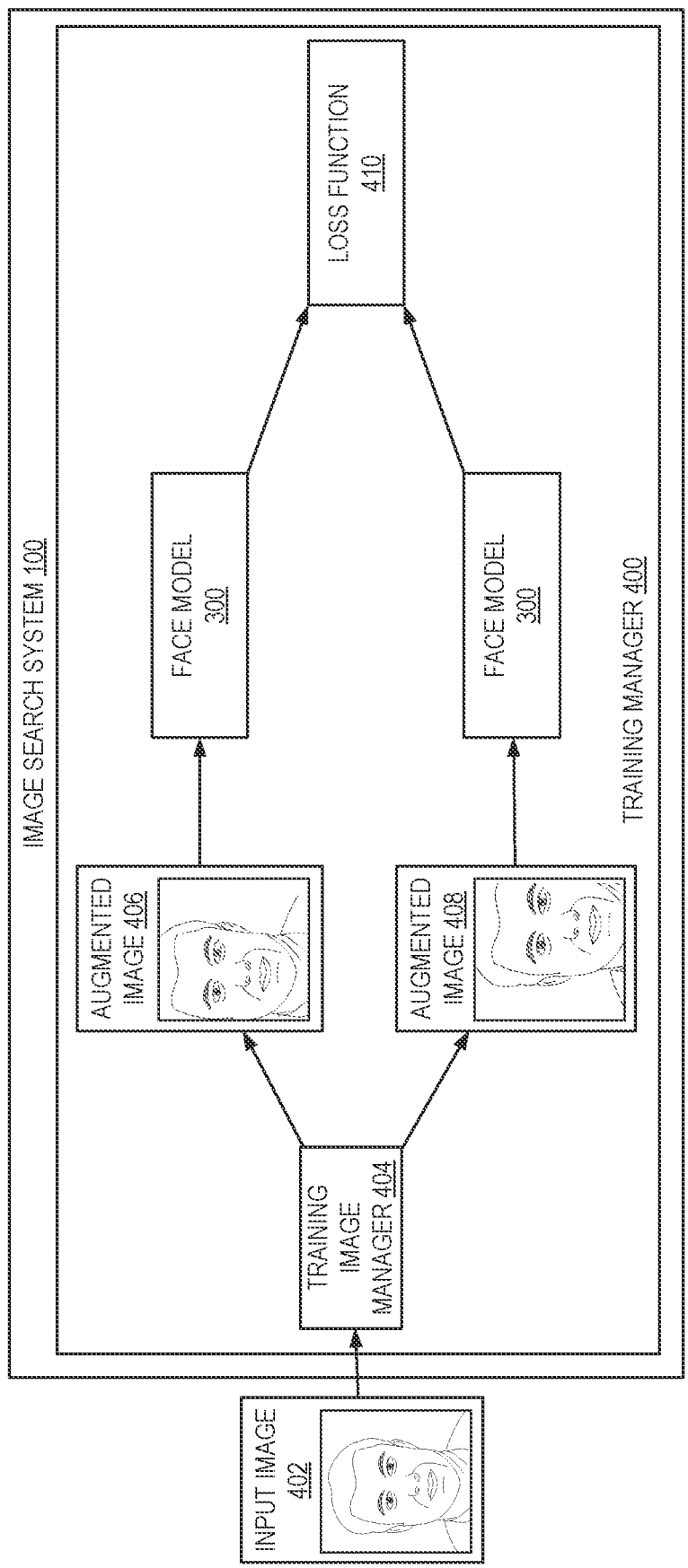
FIG. 4 illustrates an example of unsupervised training of a neural network to find similar persons, in accordance with an embodiment.

FIG. 4 illustrates an example of unsupervised training of a neural network to find similar persons, in accordance with an embodiment. As discussed, embodiments use a neural network to map an input image into an image embedding. The image embedding is then used to identify similar images in the embedding space. To do this, the neural network needs to be trained to accurately map input images to image embeddings. As shown in FIG. 4, image search system 100 includes training manager 400. Alternatively, in some embodiments, training manager 400 is implemented as a separate system from image search system 100. training is performed using an input training image 402 from a training dataset. In some embodiments, both supervised and unsupervised training techniques are used to train the neural network. In the example of FIG. 4, unsupervised learning is used.

Input image 402 is received by training image manager 404. Training image manager 404 uses the input image 402 to make one or more augmented images 406 and 408. The augmented images are created by modifying the input image. In some embodiments, the training image manager 404 is implemented as a stochastic data augmentation module. The training image manager 404 transforms the image by, for example, randomly cropping the input image, as shown in FIG. 4. Alternative transformations may also be implemented. For example, in some embodiments, the transformations include on or more of resizing, rotation, flipping, color distortions, noise, blur and other filters, overlaying blocks or other shapes to partially occlude portions of the input image, etc.

This results in a pair of augmented images 406, 408 which vary from the original input image according to the transformations that were applied to the input image. Each augmented image is then provided to face model 300. As discussed above, the neural network manager 106 includes one or more models (e.g., a face model, body model, etc.). Each model is trained independently. In the example of FIG. 4, face images are used for training the face model 300. Similarly, the same techniques are used to train the body model using a training image data set that includes body images. In some embodiments, the training image data set used to train each model is the same. In such instances, the training images are passed through an object detector (such as person detector 104, described above), to generate the face training images and the body training images from the training data set. Alternatively, the training image data set used for a given model is different from the training image data used to train any other model.

Face model 300 generates a face embedding for each augmented image 406, 408. As discussed, if a body model were being trained then the body model would generate a body embedding for the training images. The model being trained (e.g., in this example the face model 300) is trained by minimizing loss function 410 calculated based on the embeddings generated for the pair of augmented images. In particular, in this example, the loss function 410 includes a loss function drawn from a family of loss functions that maximize agreement between the two embeddings, such as, but not limited to, a normalized temperature-scaled cross entropy loss function, a contrastive loss function, or a margin triplet loss function. By minimizing this loss function, the model is trained to maximize the similarity between the embeddings. As a result, the model learns to generate similar embeddings for similar images.

The example of FIG. 4 enables training to be performed on data which has not been labeled with identities (e.g., where it is unknown whether the same person is shown in different images). However, if a training dataset is available which is labeled with identities, such that it is known whether two different training images include representations of the same person, then supervised training task may be performed.

Figure 5:
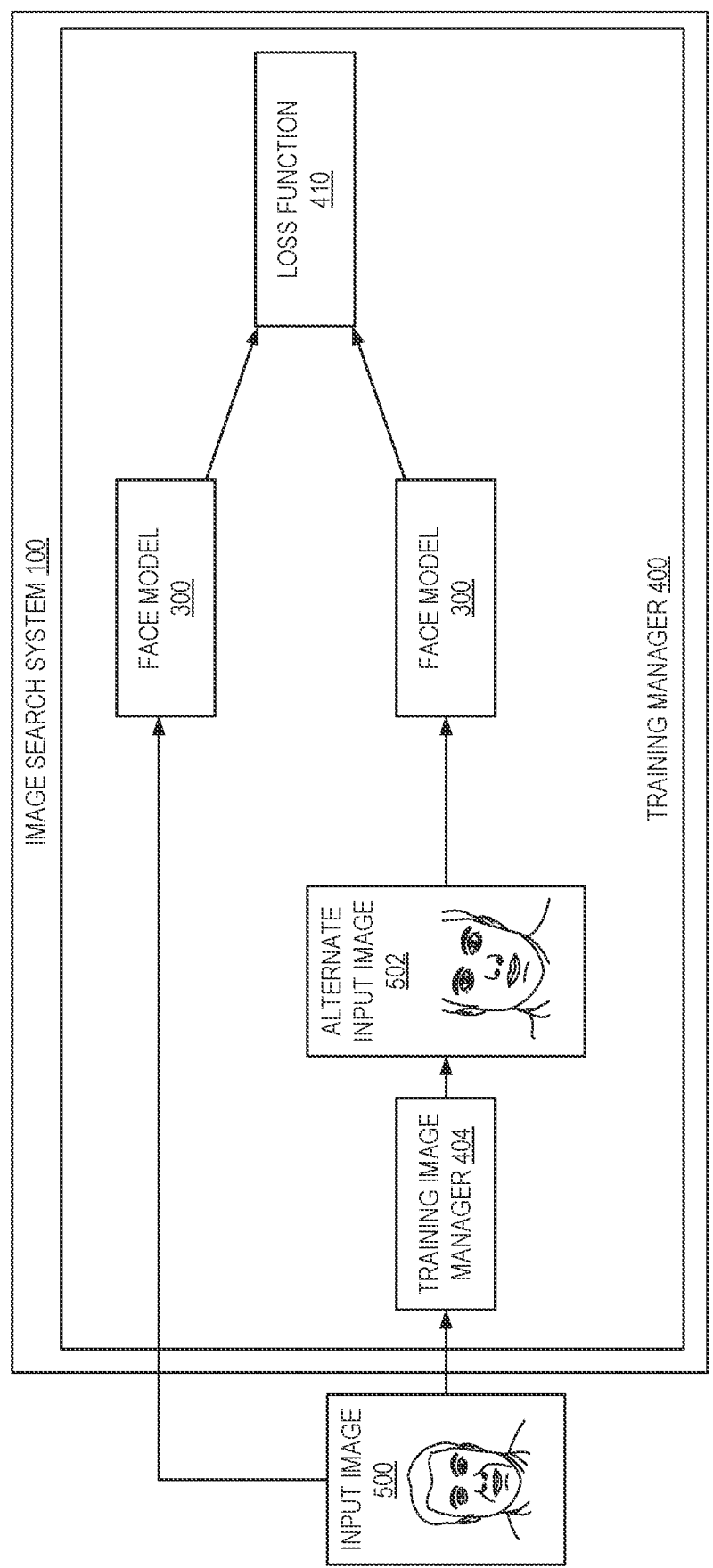
FIG. 5 illustrates an example of supervised training of a neural network to find similar persons, in accordance with an embodiment.

FIG. 5 illustrates an example of supervised training of a neural network to find similar persons, in accordance with an embodiment. As shown in FIG. 5, an input image 500 is received by training manager 400. In this example, input image 500 is associated with an identity label. Using the identity label, training image manager 404 identifies an alternate input image 502 that is also associated with the same identity label. For example, the training image manager 404 reads the label associated with input image 500 and queries a training data set for any other training images associated with that label. If no training images are found with that label, then the training technique described above with respect to FIG. 4 is used on the input image. If other training images that share the same identity label are found, then one is selected (e.g., randomly) as the alternate input image 502.

Training then proceeds similarly to that described above with respect to FIG. 4. For example, face model 300 generates a face embedding for the input image 500 and the alternate input image 502. The model being trained (e.g., in this example the face model 300) is trained by minimizing loss function 410 calculated based on the embeddings generated for the pair of images, this results in maximizing the similarity between the embeddings. Although the example of FIG. 5 shows training performed using training images of faces, alternatively training is performed using body images to train a body model in a similar fashion.

Figure 6:
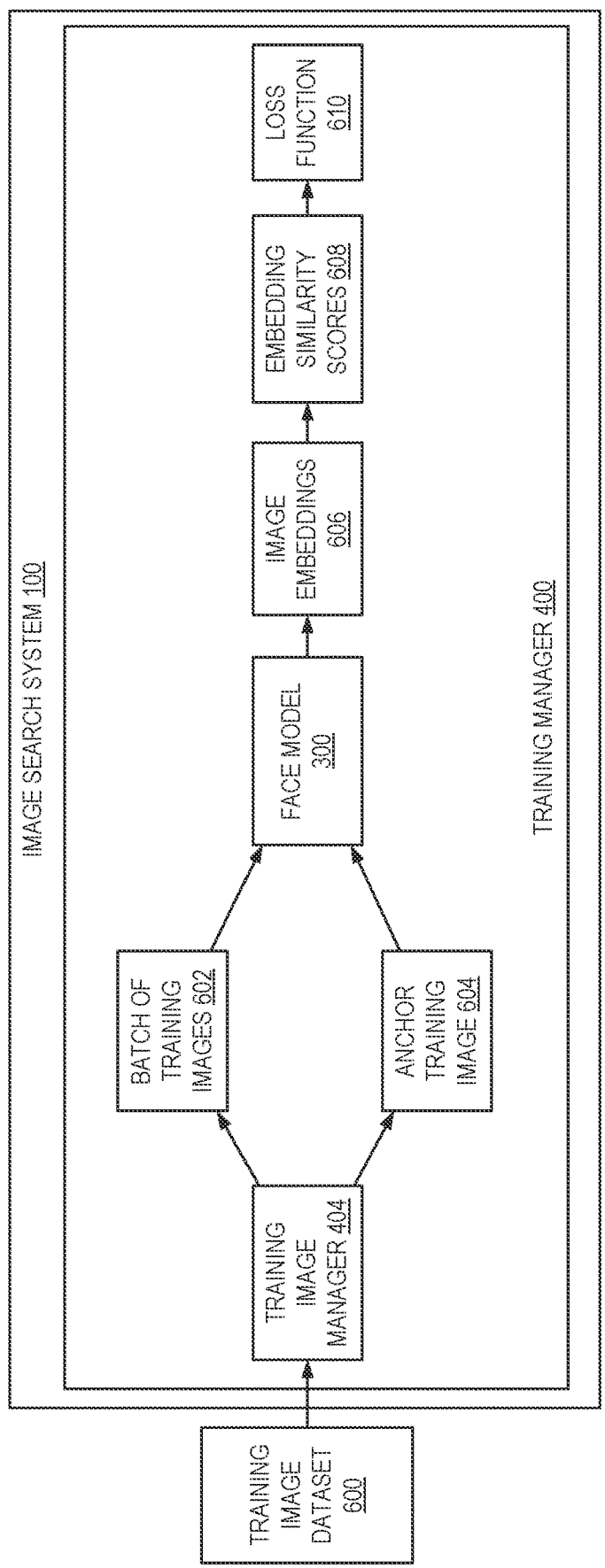
FIG. 6 illustrates an example of training a neural network to find similar persons, in accordance with one or more embodiments.

FIG. 6 illustrates an example of training a neural network to find similar persons, in accordance with one or more embodiments. As discussed, training of the machine learning models is performed using a training image dataset 600. In some embodiments, the training image data includes digital images that are labeled with identities of the person depicted in the image. For instance, in one embodiment the training image dataset includes high resolution images corresponding to approximately 630 thousand unique identities, where the number of images per identity ranges from one to approximately seventy.

In some embodiments, the training image dataset is created from a stock image dataset using a face detection model to identify faces in the dataset. Any image that is determined to have multiple faces represented is discarded and any image that is determined to have a single face represented is added to the training image dataset. This way, training is performed using images that depict only one person. Identity information is obtained using release identifiers corresponding to the subject of the image.

As shown in FIG. 6, training image manager 404 obtains a batch of training images 602 from the training image dataset. In some embodiments, the batch of training images 602 is randomly selected from the training image dataset. Alternatively, the batch of images 602 is selected such that no identities are replicated in the batch. Various batch sizes can be used during training. For example, in one embodiment, the batch size is 1024. Training image manager 404 then selects one image from the batch of training images 602 and obtains anchor training image 604 based on the selected image. For example, anchor training image 604 corresponds to an alternate input image including a representation of the same identity as the selected image, or anchor training image corresponds to an augmented image generated based on the selected image.

The batch of training images 602 and the anchor training image 604 are then passed to neural network manager 106 to generate image embeddings 606 for each image. As discussed, if the face model is being trained, then the batch of training images 602 and the anchor training image include face crop images that are provided to a face model to generate face embeddings. Similarly, if the body model is being trained, then the batch of training images 602 and the anchor training image include body crop images that are provided to a body model to generate body embeddings. After getting the embeddings of face crops in the batch, then training manager 400 calculates their similarities with the anchor embedding, as shown in the equation below.

$$s_{i,j} = \frac{z_i^T z_j}{(\|z_i\| \|z_j\|)}$$

As shown, pairwise similarity $s_{i,j}$ is calculated for each pair of image embeddings (e.g., where $z_i$ is an image embedding from the batch of training images, and $z_j$ is the anchor image embedding). In this example, cosine similarity is used as the similarity function, however in various embodiments different similarity functions are used to determine the pairwise similarity between pairs of embeddings. The resulting similarity values 608 are then used to calculate the loss between the pairs of embeddings using loss function 610. In one embodiment, a categorical cross entropy loss is used to calculate this loss, as shown below.

$$\ell(i, j) = -\log \frac{\exp\left(\frac{s_{i,j}}{\tau}\right)}{\sum_{k=1}^{2N} \mathbb{1}_{k \neq i} \exp\left(\frac{s_{i,k}}{\tau}\right)}$$

In this loss function, $\mathbb{1}_{k \neq i}$ is an indicator function evaluating to 1 if and only if k≠i, and τ represents a temperature parameter that is tunable (e.g., during training). By training to minimize this loss function, the agreement between the embeddings generated from similar images. Although the example of FIG. 6 minimizes a categorical cross entropy loss function, in various embodiments other loss functions are used.

Figure 7:
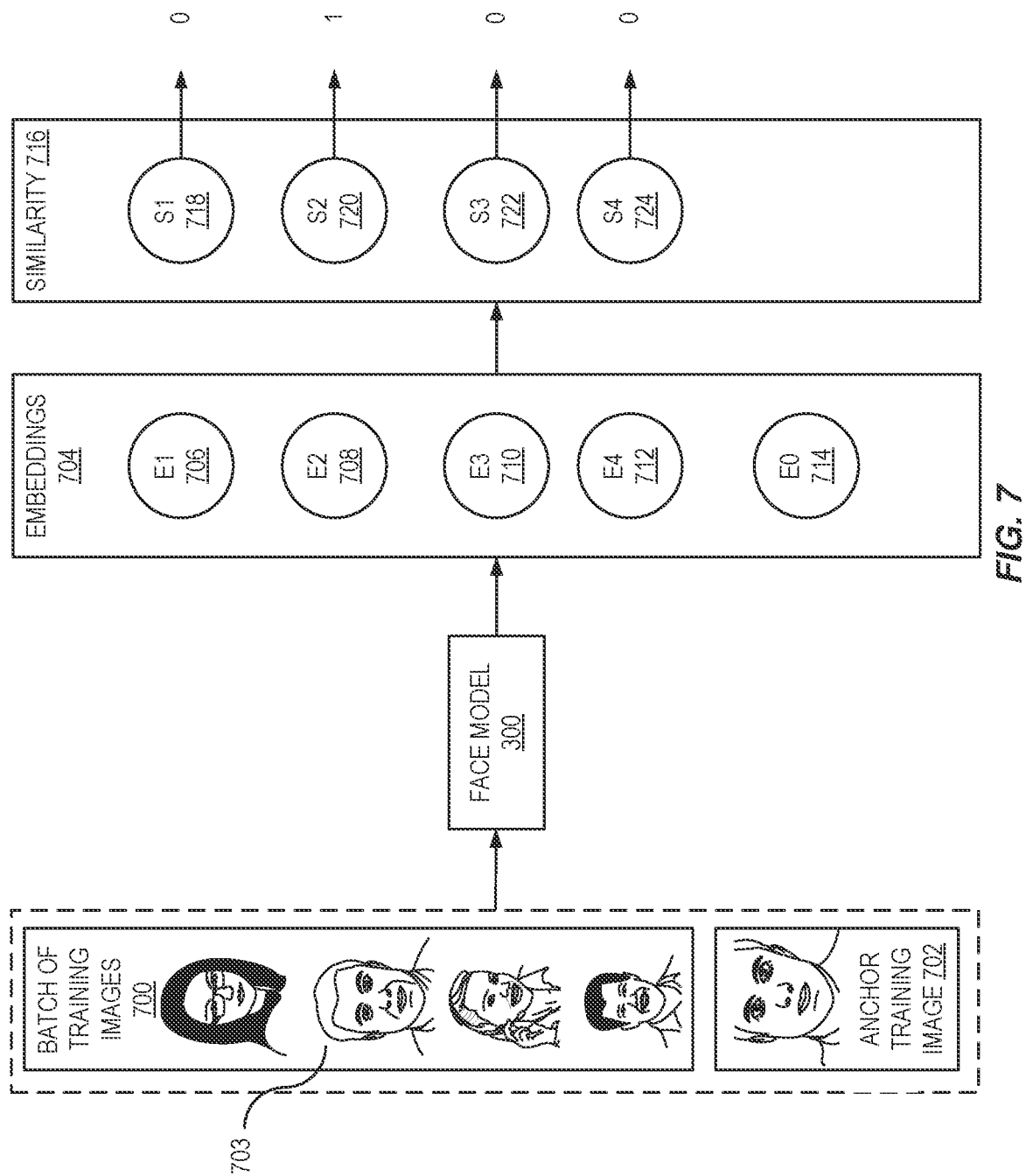
FIG. 7 illustrates an example of training a neural network based on similarity scores to find similar persons, in accordance with one or more embodiments.

FIG. 7 illustrates an example of training a neural network based on similarity scores to find similar persons, in accordance with one or more embodiments. In the example of FIG. 7, a batch of training images 700 is obtained from a training image dataset. As shown, this batch includes a plurality of images that include face crops. Although four images are shown in batch of training images 700, in various embodiments the batch size is larger or smaller. An anchor training image 702 is also obtained. In this example, the identity of anchor training image 702 is the same as the identity of image 703 from the batch of training images 700. As discussed, the anchor training image is obtained by randomly selecting one of the training images from the batch of training images 700 and searching the training image dataset for an alternate image having the same identity label. If no other image having the same identity label is found, then the selected image is augmented to create the anchor training image, as discussed above.

Each image from the batch and the anchor are passed to neural network manager 106. A model (in this example, a face model) then generates an embedding for each image. As shown in FIG. 7, embeddings 704 include face embeddings generated for each image. For example, embeddings E1 706-E4 712 correspond to the images from the batch of training images, and E0 714 corresponds to the anchor. Pairwise similarity scores are then calculated for each embedding and the anchor embedding, resulting in similarity scores 716. As shown, the resulting similarity is low for images of different identities (e.g., S1 718, S3 722, and S4 724) and high for the image that has the same identity label as the anchor (e.g., S2 720). These similarity scores are then used to train the model based on minimizing a loss function (such as the categorical cross entropy loss function described above) to maximize the agreement between the embeddings of similar images.

Figure 8:
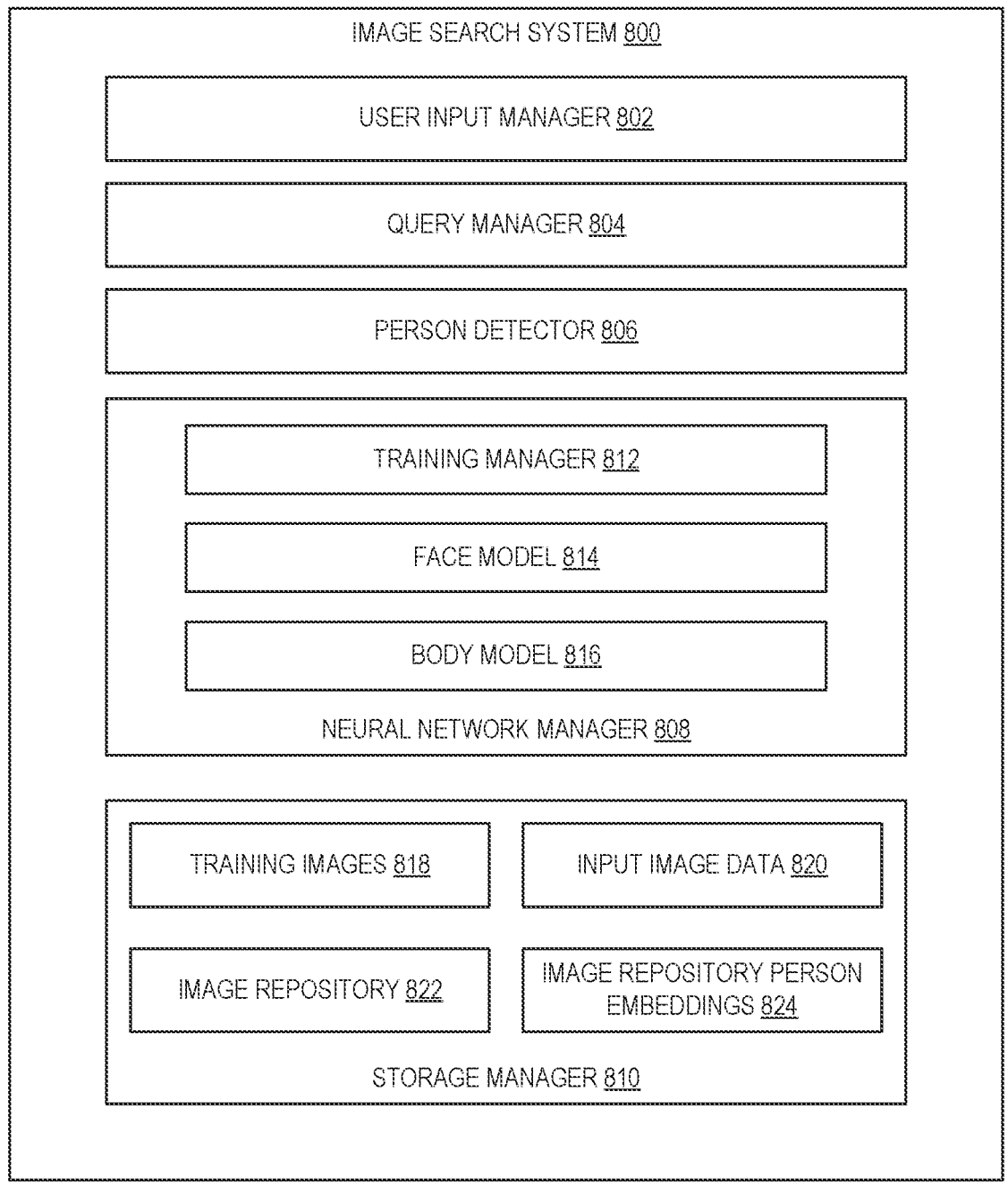
FIG. 8 illustrates a schematic diagram of an image search system in accordance with one or more embodiments.

FIG. 8 illustrates a schematic diagram of an image search system 800 in accordance with one or more embodiments. In particular, FIG. 8 shows a schematic diagram of the image search system 800, such as image search system 100 described above in relation to FIG. 1. As shown, the image search system includes, but is not limited to, a user input manager 802 (such as user input manager 103, discussed above), a query manager 804 (such as query manager 110, discussed above), a person detector 806 (such as person detector 104, discussed above), a neural network manager 808 (such as neural network manager 106, discussed above), and a storage manager 810 (such as storage manager 112, discussed above). Neural network manager 804 includes a training manager 812, a face model 814, and a body model 816. Storage manager 810 includes training images 818, input image data 820, image repository 822.

The image search system 800 includes a user input manager 802 that allows users to provide input to the search system. For example, the user input manager 802 allows users to select an image to be used as a query for the search system. In some embodiments, the user input manager 802 enables a user to upload the image or select an image that is accessible by storage manager 810. The user input manager also enables the user to view, select, or otherwise interact with search results.

As illustrated in FIG. 8, the image search system 800 includes a query manager 804. The query manager 804 receives an input image and coordinates other components of the image search system 800 to identify one or more images that depict similar persons to that depicted in the input image from one or more image repositories. For example, as discussed, an input image comprises a digital image that includes a representation of a person. When an input image is received by query manager 804 it provides the input image to person detector 806.

As shown in FIG. 8, the image search system 100 also includes a person detector 806. In some embodiments, person detector 806 comprises a neural network, such as a CNN, that has been trained to identify people in digital image data. The person detector 806 outputs bounding boxes around each person in the input image. In some embodiments, the person detector 806 includes multiple object detectors. For example, as discussed, person detector 806 includes a face detector which has been trained to detect representations of people's faces, and a body detector to detect representations of people's bodies. The person detector 806 outputs bounding boxes around the detected representations which are used to generate a face crop and a body crop of the input image. The face crop and the body crop are provided to neural network manager 808.

As further illustrated in FIG. 8, the image search system 800 includes the neural network manager 808 that includes training manager 812, face model 814, and body model 816. The training manager 812 is configured to teach, guide, tune, and/or train one or more neural networks. In particular, the training manager 812 trains a neural network based on a plurality of training data (e.g., training images 818). As discussed, the training images include digital images that include representations of people. In particular, each training image includes a representation of a single person. In some embodiments, the training images are labeled with identity labels that uniquely identify an identity associated with the person depicted in the image. More specifically, the training manager 812 is configured to access, identify, generate, create, and/or determine training input and utilize the training input to train and fine-tune a neural network. For instance, the training manager 812 trains the face model and the body model, as discussed above.

In addition, and as mentioned directly above, the neural network manager 808 manages the training and the use of various neural networks. In particular, the neural network manager 808 manages the training and utilization of the face model 814 and the body model 816. The face model and body model 816 include one or all of the features and functions described above with respect to the neural network manager 106, face model 300, and body model 308. Moreover, in one or more embodiments the search embeddings can be generated using other types of networks.

Figure 10:
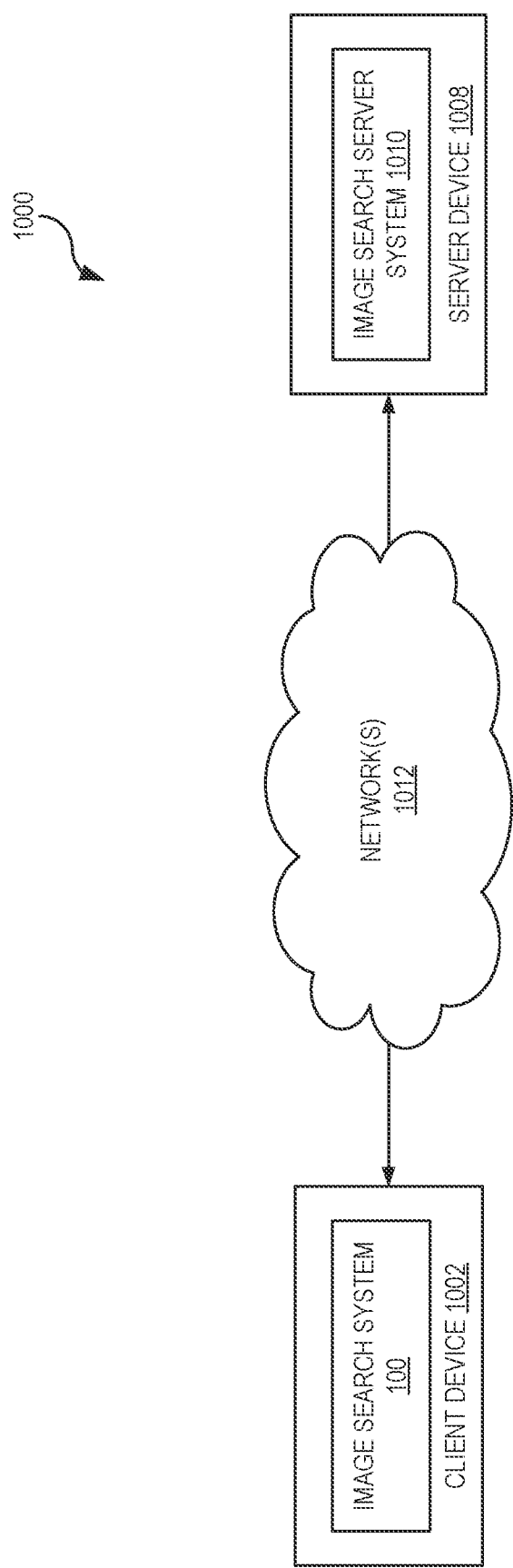
FIG. 10 illustrates a schematic diagram of an exemplary environment in which an image search system is implemented in accordance with one or more embodiments.

As illustrated in FIG. 10, the image search system 800 also includes the storage manager 810. The storage manager 810 maintains data for the image search system 800. The storage manager 810 is configured to maintain data of any type, size, or kind as necessary to perform the functions of the image search system 800. The storage manager 810, as shown in FIG. 8, includes the training images 818. The training images 818 include a plurality of digital training images depicting persons, as discussed in additional detail above. In particular, in one or more embodiments, the training images 818 include digital training images utilized by the training manager 812 to train one or more neural networks to generate person embeddings of input images.

As further illustrated in FIG. 8, the storage manager 810 also includes input image data 820. Input image data 820 includes information for any digital image utilized by the image search system 800. For example, input image data 820 includes a digital image provided by a user, where the user seeks to identify other images that include persons who appear similar to the person shown in the input image. The storage manager 810 also includes image repository data 822. The image repository data 822 includes a plurality of images of people. The image repository data 822 includes, in some embodiments, public image repositories, and/or private image repositories maintained by a design firm, private company, or other entity. The storage manager 810 also includes image repository person embeddings 824. The image repository person embeddings 824 correspond to the images in the image repository 822 and were generated using face model 814 and body model 816 to obtain face and body embeddings, respectively, for each image in image repository 822. As discussed, the face and body embeddings are then concatenated to create person embeddings. The image repository person embeddings are compared to a person embedding generated for an input image to identify images in the image repository that include representations of persons who appear similar to the person depicted in the input image, as discussed above.

Each of the components 804-810 of the image search system 100 and their corresponding elements (as shown in FIG. 8) are in communication with one another using any suitable communication technologies. It is recognized that although components 804-810 and their corresponding elements are shown to be separate in FIG. 8, any of components 804-810 and their corresponding elements are combined into fewer components, such as into a single facility or module, divided into more components, or configured into different components as serves a particular embodiment.

The components 804-810 and their corresponding elements comprise software, hardware, or both. For example, the components 804-810 and their corresponding elements comprise one or more instructions stored on a computer-readable storage medium and executable by processors of one or more computing devices. When executed by the one or more processors, the computer-executable instructions of the image search system 100 cause a client device and/or a server device to perform the methods described herein. Alternatively, the components 804-810 and their corresponding elements comprise hardware, such as a special purpose processing device to perform a certain function or group of functions. Additionally, the components 804-810 and their corresponding elements comprise a combination of computer-executable instructions and hardware.

Furthermore, the components 804-810 of the image search system 100, for example, are implementable as one or more stand-alone applications, as one or more modules of an application, as one or more plug-ins, as one or more library functions or functions that are called by other applications, and/or as a cloud-computing model. Thus, the components 804-810 of the image search system 100 are implementable as a stand-alone application, such as a desktop or mobile application. Furthermore, the components 804-810 of the image search system 100 are implementable as one or more web-based applications hosted on a remote server. Alternatively, or additionally, the components of the image search system 100 are implemented in a suit of mobile device applications or "apps." To illustrate, the components of the image search system 100 are implemented in a digital image editing application or digital image search application, including but not limited to ADOBE® ILLUSTRATOR®, ADOBE® PHOTOSHOP®, ADOBE® STOCK, or ADOBE® CREATIVE CLOUD®. "ADOBE," "ILLUSTRATOR," "PHOTOSHOP," and "CREATIVE CLOUD" are either registered trademarks or trademarks of Adobe Systems Incorporated in the United States and/or other countries.

Figure 9:
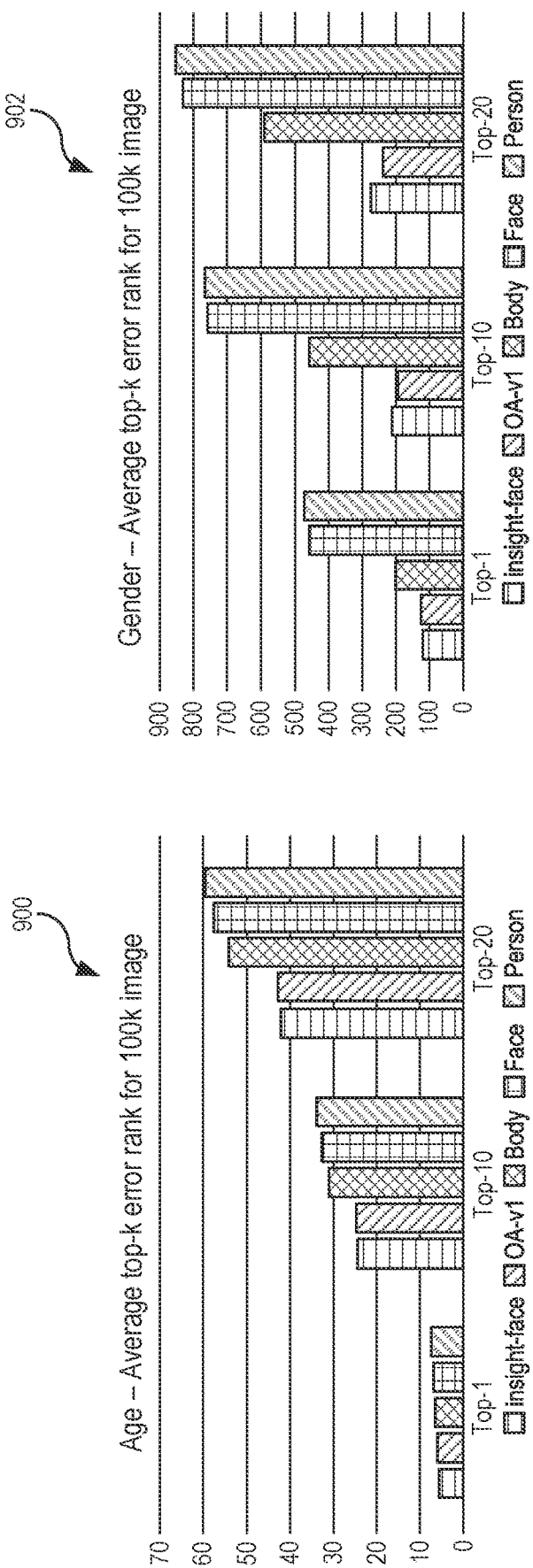
FIG. 9 illustrates search performance results, in accordance with one or more embodiments.

FIG. 9 illustrates search performance results, in accordance with one or more embodiments. Embodiments described above outperform existing raster-based methods for identifying similar persons in images. For example, in FIG. 9 the performance of the face embedding, body embedding, and person embedding have been compared to an insight-face embedding, an ObjectArrangement v1 embedding. The metric used to compare these embeddings' performance when used in image search is a measure of where in the search results the first error is detected. For example, the top-k error indicates the average position at which the first k errors were detected. The top-1 error indicates the ranked position at which the first error is detected, the top-2 error is the ranked position of the first error plus the ranked position of the second error divided by two, and so on. The image search techniques as described herein are used with each embedding for comparison purposes.

As shown at 900, the person embedding when used in search outperformed all other embeddings for identifying similar images of people having a correct age attribute with the query image. The face embedding and body embedding were the next best performing, respectively. All three embeddings outperformed the state-of-the-art embeddings represented by the insight-face embedding and the OA-v1 embedding. Likewise, as shown at 902, the person embedding outperformed all other embeddings when searching for images of people of similar genders.

FIG. 10 illustrates a schematic diagram of an exemplary environment 1000 within which an image search system 100 (or simply "search system" 100) operates. In one or more embodiments, the exemplary environment 1000 includes a client device 1002, a server device 1008, and one or more networks 1012. The network(s) 1012 include any suitable network over which the computing devices communicate. Example and features of computing devices (e.g., the client device 1002 and the server device 1008) and networks (e.g., network(s) 1012) are discussed in more detail below with regard to FIGS. 13-14.

As illustrated in FIG. 10, the environment 1000 includes the client device 1002 having an image search system 100. The image search system 100 generally facilitates the searching of image content stored in one or more image repositories. In one or more embodiments, the image search system 100 is a search application made available as part of an image repository, such as ADOBE® STOCK. In other embodiments, the image search system 100 includes multiple applications, functions, and operations relating to graphical content, such as an application suite, a web-based application, and/or system operations on the client device 1002.

In addition, the environment 1000 includes the server device 1008. The server device 1008 generates, stores, receives, and/or transmits any type of data, including search result data. As shown, the server device 1008 includes an image search server system 1010 that communicates with the image search system 100 on the client device 1002. For example, the image search server system 1010 receives an image to be used for searching an image repository accessible to the server device 1008. In such embodiments, the image search system 100 serves as a lightweight user interface implemented on the user's client device, while the machine learning-based components discussed above are implemented in the image search server system 1010. Alternatively, in some embodiments, the image search system 100 includes the neural network manager discussed above, enabling the image search system 100 to generate a person embedding for an image accessible to the client device 1002. This person embedding is then provided to image search server system 1010 to identify similar images in an image repository accessible to server device 1008. Notably, while only a single server device is shown, the image search server system 1010 is implemented across multiple server devices.

While not illustrated, in one or more embodiments, the server device 1008 includes all, or a portion of, the image search system 100, such as within the image search server system 1010. For example, when located in the server device 1008, the image search system 100 comprises an application running on the server device 1008 or a portion of a software application that is downloaded to the client device 1002. For instance, the image search system 100 includes a web hosting application that allows the client device 1002 to interact with the image search server system 1010 hosted at the server device 1008. In this manner, the server device 1008 performs image searches based on inputs received from a designer using client device 1002.

Figure 11:
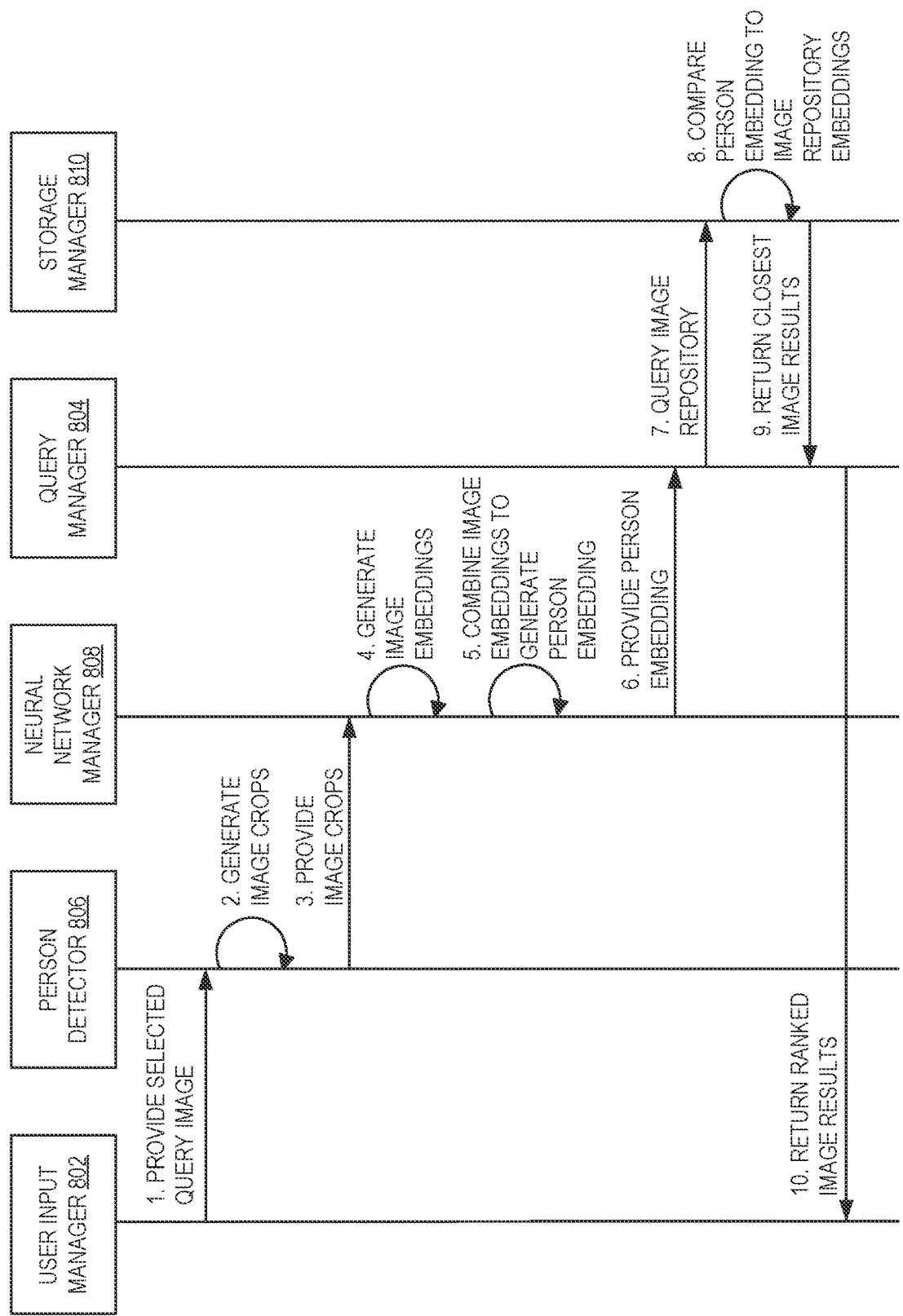
FIG. 11 illustrates a sequence diagram of an image search system in accordance with one or more embodiments.

FIG. 11 illustrates a sequence diagram 1100 of an image search system in accordance with one or more embodiments. As shown in FIG. 11, a user searches for similar images to a query image by selecting an image which includes a visual representation of a person which the user wants to search. At numeral 1, the selected query image is provided to person detector 806 by user input manager 802. As discussed, person detector 806 is an object detector trained to identify people in image data. In some embodiments, person detector 806 includes multiple object detectors, each trained to identify a different portion of a person in image data. For example, the person detector 806 includes a face detector and a body detector. These detectors generate bounding boxes around portions of the image that are likely to include the object they were trained to identify. Using these bounding boxes, person detector 806 generates image crops at numeral 2. For example, a first image crop is a face crop which primarily includes a face identified in the query image, and a second image crop is a body crop which primarily includes a body of a person identified in the query image. At numeral 3, the person detector 806 provides the image crops to neural network manager 808.

At numeral 4, neural network manager 808 generates image embeddings from the image crops. As discussed, neural network manager 808, in some embodiments, manages multiple machine learning models. For example, the neural network manager 808 manages a face model trained to generate face embeddings from images of faces and a body model trained to generate body embeddings from images of bodies. As discussed, the machine learning models are trained using contrastive learning such that the embeddings generated from similar images are similar. At numeral 5, the image embeddings (e.g., the face embedding and the body embedding) are combined to generate a person embedding. In some embodiments, the person embedding is generated by concatenating the face and body embeddings. At numeral 6, the person embedding is provided to query manager 804.

As discussed, query manager 804 is configured to search for similar images in embedding space. For example, storage manager 810 manages and/or provides access to one or more image repositories. Images in the one or more image repositories have previously had corresponding person embeddings generated for them, using the techniques described herein. When query manager receives a query person embedding, it compares the query person embedding to the person embeddings in the image repository. For example, a distance metric, such as L2 distance, is used to determine how close the query embedding is to the image embeddings from the image repository, at numeral 8. The images corresponding to the "closest" (e.g., as determined by their L2 distance or other distance) to the query embedding are returned at numeral 9. In some embodiments, only a subset of images are returned (e.g., images that are within a threshold distance of the query image). Alternatively, all or some of the images are returned and ranked according to how close their image embeddings are to the query embedding. At numeral 10, the image results are returned to the user via user input manager 802.

Figure 12:
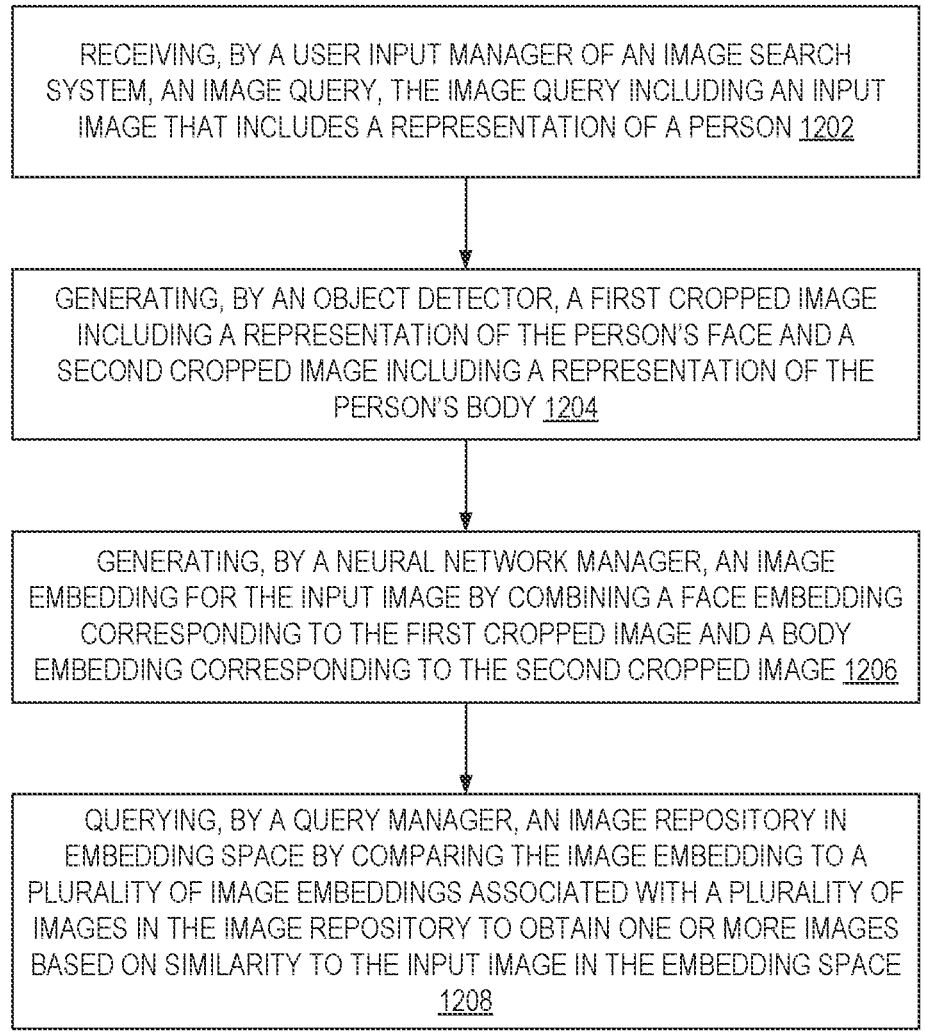
FIG. 12 illustrates a flowchart of a series of acts in a method of finding similar persons in images, in accordance with one or more embodiments.

FIGS. 1-11, the corresponding text, and the examples, provide a number of different systems and devices that allows a user to facilitate selection of target individuals within digital visual media. In addition to the foregoing, embodiments are described in terms of flowcharts comprising acts and steps in a method for accomplishing a particular result. For example, FIG. 12 illustrates flowcharts of exemplary methods in accordance with one or more embodiments. The methods described in relation to FIG. 12 are performable with fewer or more steps/acts or the steps/acts are performable in differing orders. Additionally, the steps/acts described herein are repeatable or performable in parallel with one another or in parallel with different instances of the same or similar steps/acts.

FIG. 12 illustrates a flowchart of a series of acts in a method of finding similar persons in images in accordance with one or more embodiments. In one or more embodiments, the method 1200 is performed in a digital medium environment that includes the image search system 100. The method 1200 is intended to be illustrative of one or more methods in accordance with the present disclosure and is not intended to limit potential embodiments. Alternative embodiments include additional, fewer, or different steps than those articulated in FIG. 12.

As illustrated in FIG. 12, the method 1200 includes an act 1202 of receiving, by a user input manager of an image search system, an image query, the image query including an input image that includes a representation of a person. For example, in some embodiments the user uploads an image that includes a representation of a person to use as the input image. In some embodiments, the user selects an image through a user interface and requests that images with similar persons to the selected image be found.

As illustrated in FIG. 12, the method 1200 includes an act 1204 of generating, by an object detector, a first cropped image including a representation of the person's face and a second cropped image including a representation of the person's body. For example, in some embodiments multiple object detectors are used, such as a face detector and a body detector, to detect different portions of a representation of a person in an image. In some embodiment, generating the first cropped image further comprises identifying, by a face detector, a first bounding box associated with the face of the representation of the person in the input image, and generating the first cropped image using the first bounding box. In some embodiments, generating the second cropped image further comprises identifying, by a body detector, a second bounding box associated with the representation of the person in the input image, and generating the second cropped image using the second bounding box.

As illustrated in FIG. 12, the method 1200 includes an act 1206 of generating, by a neural network manager, an image embedding for the input image by combining a face embedding corresponding to the first cropped image and a body embedding corresponding to the second cropped image. As discussed, in some embodiments the neural network manager manages multiple machine learning models, such as a face model that has been trained to generate face embeddings from input images of faces, and a body model that has been trained to generate body embeddings from input images of people. For example, in some embodiments, the face model is a neural network trained on a face training image set using contrastive learning which includes minimizing a loss function to maximize agreement of embeddings generated from similar images. Similarly, in some embodiments, the body model is a neural network trained on a body training image set using contrastive learning which includes minimizing a loss function to maximize agreement of embeddings generated from similar images. In some embodiments, the face model and body model share a model architecture and differ in the training data that was used to train each model.

In some embodiments, generating an image embedding further includes generating, by a face model of the neural network manager, the face embedding for the first cropped image, and generating, by a body model of the neural network manager, the body embedding for the second cropped image. In some embodiments, combining the face embedding and the body embedding includes concatenating the face embedding and the body embedding to generate the image embedding.

As illustrated in FIG. 12, the method 1200 includes an act 1208 of querying, by a query manager, an image repository in embedding space by comparing the image embedding to a plurality of image embeddings associated with a plurality of images in the image repository to obtain one or more images based on similarity to the input image in the embedding space. In some embodiments, querying the image repository further includes calculating a similarity metric between the image embedding and the plurality of image embeddings corresponding to the plurality of images in the image repository, and returning the one or more images ranked according to the similarity metric.

Figure 13:
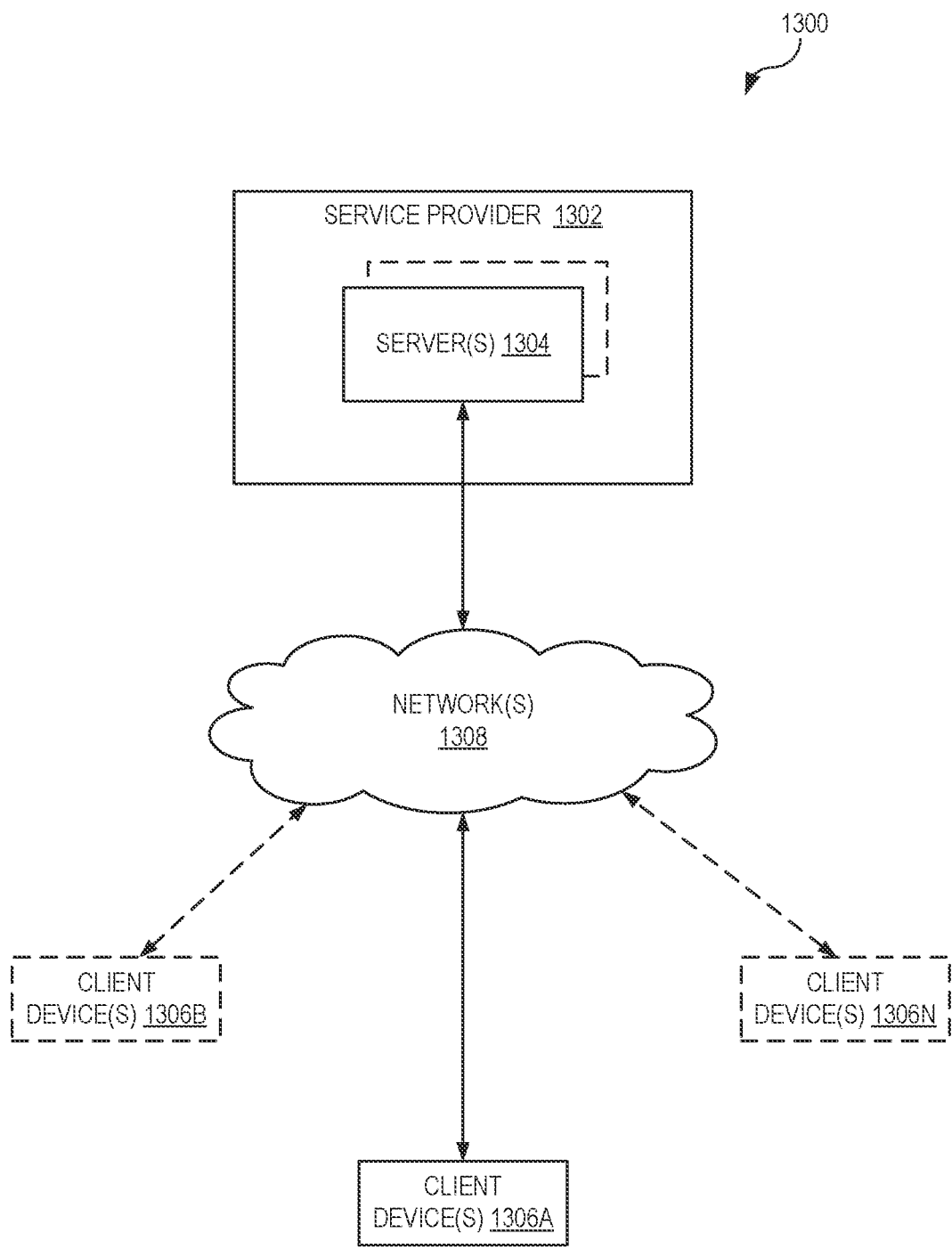
FIG. 13 illustrates a schematic diagram of an exemplary environment in which the image search system operates in accordance with one or more embodiments.

FIG. 13 illustrates a schematic diagram of an exemplary environment 1300 in which the image search system 100 operates in accordance with one or more embodiments. In one or more embodiments, the environment 1300 includes a service provider 1302 which includes one or more servers 1304 connected to a plurality of client devices 1306A-1306N via one or more networks 1308. The client devices 1306A-1306N, the one or more networks 1308, the service provider 1302, and the one or more servers 1304 communicate with each other or other components using any communication platforms and technologies suitable for transporting data and/or communication signals, including any known communication technologies, devices, media, and protocols supportive of remote data communications, examples of which are described in more detail below with respect to FIG. 14.

Although FIG. 13 illustrates a particular arrangement of the client devices 1306A-1306N, the one or more networks 1308, the service provider 1302, and the one or more servers 1304, various additional arrangements are possible. For example, the client devices 1306A-1306N directly communicate with the one or more servers 1304, bypassing the network 1308. Or alternatively, the client devices 1306A-1306N directly communicate with each other. The service provider 1302 is a public cloud service provider which owns and operates their own infrastructure in one or more data centers and provides this infrastructure to customers and end users on demand to host applications on the one or more servers 1304. The servers include one or more hardware servers (e.g., hosts), each with its own computing resources (e.g., processors, memory, disk space, networking bandwidth, etc.) which are securely divided between multiple customers, each of which host their own applications on the one or more servers 1304. In some embodiments, the service provider is a private cloud provider which maintains cloud infrastructure for a single organization. The one or more servers 1304 similarly include one or more hardware servers, each with its own computing resources, which are divided among applications hosted by the one or more servers for use by members of the organization or their customers.

Similarly, although the environment 1300 of FIG. 13 is depicted as having various components, in some embodiments, the environment 1300 has additional or alternative components. For example, in some embodiments the environment 1300 is implemented on a single computing device, such as on a single client device or a single server.

As illustrated in FIG. 13, the environment 1300 includes client devices 1306A-1306N. The client devices 1306A-1306N comprise any computing device. For example, client devices 1306A-1306N comprise one or more personal computers, laptop computers, mobile devices, mobile phones, tablets, special purpose computers, TVs, or other computing devices, including computing devices described below with regard to FIG. 14. Although three client devices are shown in FIG. 13, it is appreciated that client devices 1306A-1306N comprise any number of client devices (greater or smaller than shown).

Moreover, as illustrated in FIG. 13, the client devices 1306A-1306N and the one or more servers 1304 communicate via one or more networks 1308. The one or more networks 1308 represent a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the one or more networks 1308 include any suitable network over which the client devices 1306A-1306N access service provider 1302 and server 1304, or vice versa. The one or more networks 1308 are discussed in more detail below with regard to FIG. 14.

In addition, the environment 1300 also includes one or more servers 1304. The one or more servers 1304 generate, store, receive, and/or transmit any type of data, including input image data 1312, output image data 1314, or other information. For example, a server 1304 receives data from a client device, such as the client device 1306A, and send the data to another client device, such as the client device 1302B and/or 1302N. The server 1304 also transmits electronic messages between one or more users of the environment 1300. In one example embodiment, the server 1304 is a data server. The server 1304 also comprises a communication server or a web-hosting server. Additional details regarding the server 1304 are discussed below with respect to FIG. 14.

As mentioned, in one or more embodiments, the one or more servers 1304 include or implement at least a portion of the image search system 100. In particular, the image search system 100 comprises an application running on the one or more servers 1304 or a portion of the image search system 100 is downloaded from the one or more servers 1304. For example, the image search system 100 includes a web hosting application that allows the client devices 1306A-1306N to interact with images hosted at the one or more servers 1304. To illustrate, in one or more embodiments of the environment 1300, one or more client devices 1306A-1306N access a webpage supported by the one or more servers 1304. In particular, the client device 1306A runs a web application (e.g., a web browser) to allow a user to access, view, and/or interact with a webpage or website hosted at the one or more servers 1304.

Upon the client device 1306A accessing a webpage or other web application hosted at the one or more servers 1304, in one or more embodiments, the one or more servers 1304 provide access to one or more drawing files that include Bezier geometry stored at the one or more servers 1304. Moreover, the client device 1306A receives a request (i.e., via user input) to modify one or more segments of the Bezier geometry, and provide the request to the one or more servers 1304. Upon receiving the request, the one or more servers 1304 automatically performs the methods and processes described above.

As just described, the image search system 100 is implemented in whole, or in part, by the individual elements 1302-1308 of the environment 1300. It is appreciated that although certain components of the image search system 100 are described in the previous examples with regard to particular elements of the environment 1300, various alternative implementations are possible. For instance, in one or more embodiments, the image search system 100 is implemented on any of the client devices 1306A-N. Similarly, in one or more embodiments, the image search system 100 is implemented on the one or more servers 1304. Moreover, different components and functions of the image search system 100 is implemented separately among client devices 1306A-1306N, the one or more servers 1304, and the network 1308.

Embodiments of the present disclosure comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein are implemented at least in part as instructions embodied in a non-transitory computer-readable medium and executable by one or more computing devices (e.g., any of the computing devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media include any available media that are accessible by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which is used to store desired program code means in the form of computer-executable instructions or data structures and which is accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media includes a network and/or data links which are used to carry desired program code means in the form of computer-executable instructions or data structures and which are accessed by a general purpose or special purpose computer. Combinations of the above are included within the scope of computer-readable media.

Further, upon reaching various computer system components, program code means in the form of computer-executable instructions or data structures are transferred automatically from transmission media to non-transitory computer-readable storage media (devices) (or vice versa). For example, computer-executable instructions or data structures received over a network or data link are buffered in RAM within a network interface module (e.g., a "NIC"), and then eventually transferred to computer system RAM and/or to less volatile computer storage media (devices) at a computer system. Thus, it is to be understood that non-transitory computer-readable storage media (devices) are included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions are, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art appreciate that some embodiments of the disclosure are practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure is implementable in distributed system environments where local and remote computer systems, which are linked (either by hardwired data links, wireless data links, or by a combination of hardwired and wireless data links) through a network, both perform tasks. In a distributed system environment, program modules are located in both local and remote memory storage devices.

Embodiments of the present disclosure are implemented in cloud computing environments. In this description, "cloud computing" is defined as a model for enabling on-demand network access to a shared pool of configurable computing resources. For example, cloud computing is employed in the marketplace to offer ubiquitous and convenient on-demand access to the shared pool of configurable computing resources. The shared pool of configurable computing resources is rapidly provisioned via virtualization and released with low management effort or service provider interaction, and then scaled accordingly.

A cloud-computing model includes various characteristics such as, for example, on-demand self-service, broad network access, resource pooling, rapid elasticity, measured service, and so forth. A cloud-computing model also exposes various service models, such as, for example, Software as a Service ("SaaS"), Platform as a Service ("PaaS"), and Infrastructure as a Service ("IaaS"). A cloud-computing model is deployed using different deployment models such as private cloud, community cloud, public cloud, hybrid cloud, and so forth. In this description and in the claims, a "cloud-computing environment" is an environment in which cloud computing is employed.

Figure 14:
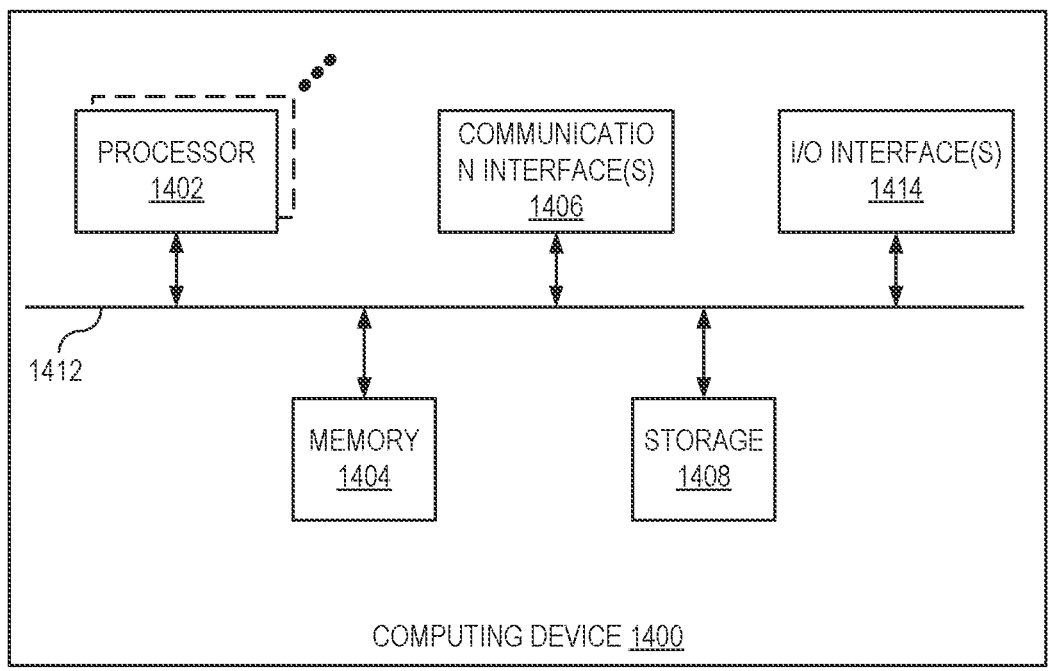
FIG. 14 illustrates a block diagram of an exemplary computing device in accordance with one or more embodiments.

FIG. 14 illustrates, in block diagram form, an exemplary computing device 1400 that is configured to perform one or more of the processes described above. One appreciates that one or more computing devices such as the computing device 1400 implement the image search system 100. As shown by FIG. 14, the computing device comprises a processor 1402, memory 1404, one or more communication interfaces 1406, a storage device 1408, and one or more I/O devices/interfaces 1410. In certain embodiments, the computing device 1400 includes fewer or more components than those shown in FIG. 14. Components of computing device 1400 shown in FIG. 14 are described in additional detail below.

In particular embodiments, processor(s) 1402 includes hardware for executing instructions, such as those making up a computer program. As an example, and not by way of limitation, to execute instructions, processor(s) 1402 retrieves (or fetch) the instructions from an internal register, an internal cache, memory 1404, or a storage device 1408 and decode and execute them. In various embodiments, the processor(s) 1402 includes one or more central processing units (CPUs), graphics processing units (GPUs), field programmable gate arrays (FPGAs), systems on chip (SoC), or other processor(s) or combinations of processors.

The computing device 1400 includes memory 1404, which is coupled to the processor(s) 1402. The memory 1404 is used for storing data, metadata, and programs for execution by the processor(s). The memory 1404 includes one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1404 includes internal or distributed memory.

The computing device 1400 further includes one or more communication interfaces 1406. A communication interface 1406 includes hardware, software, or both. The communication interface 1406 provides one or more interfaces for communication (such as, for example, packet-based communication) between the computing device and one or more other computing devices 1400 or one or more networks. As an example, and not by way of limitation, communication interface 1406 includes a network interface controller (NIC) or network adapter for communicating with an Ethernet or other wire-based network or a wireless NIC (WNIC) or wireless adapter for communicating with a wireless network, such as a WI-FI. The computing device 1400 further includes a bus 1412. The bus 1412 comprises hardware, software, or both that couples components of computing device 1400 to each other.

The computing device 1400 includes a storage device 1408 includes storage for storing data or instructions. As an example, and not by way of limitation, storage device 1408 comprises a non-transitory storage medium described above. The storage device 1408 includes a hard disk drive (HDD), flash memory, a Universal Serial Bus (USB) drive or a combination these or other storage devices.

The computing device 1400 also includes one or more input or output ("I/O") devices/interfaces 1410, which are provided to allow a user to provide input to (such as user strokes), receive output from, and otherwise transfer data to and from the computing device 1400. These I/O devices/interfaces 1410 includes a mouse, keypad or a keyboard, a touch screen, camera, optical scanner, network interface, modem, other known I/O devices or a combination of such I/O devices/interfaces 1410. The touch screen is activated with a stylus or a finger.

The I/O devices/interfaces 1410 includes one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 1410 is configured to provide graphical data to a display for presentation to a user. The graphical data is representative of one or more graphical user interfaces and/or any other graphical content as serves a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments include other specific forms without departing from its spirit or essential characteristics. The described embodiments are to be considered in all respects only as illustrative and not restrictive. For example, the methods described herein are performable with fewer or more steps/acts or the steps/acts are performable in differing orders. Additionally, the steps/acts described herein are repeatable or performable in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor is it to be understood to, imply that a given embodiment requires at least one of A, at least one of B, or at least one of C to each be present.

We claim:

1. A computer-implemented method comprising:
    receiving, by a user input manager of an image search system, an image query, the image query including an input image that includes a representation of a person;
    generating, by an object detector, a first cropped image including a representation of the person's face and a second cropped image including a representation of the person's body;
    generating, by a neural network manager, an image embedding for the input image by combining a face embedding corresponding to the first cropped image and a body embedding corresponding to the second cropped image; and
    querying, by a query manager, an image repository in embedding space by comparing the image embedding to a plurality of image embeddings associated with a plurality of images in the image repository to obtain one or more images based on similarity to the input image in the embedding space.

2. The computer-implemented method of claim 1, wherein generating, by an object detector, a first cropped image including a representation of the person's face and a second cropped image including a representation of the person's body, further comprises:
    identifying, by a face detector, a first bounding box associated with the face of the representation of the person in the input image; and
    generating the first cropped image using the first bounding box.

3. The computer-implemented method of claim 2, further comprising:
    identifying, by a body detector, a second bounding box associated with the representation of the person in the input image; and
    generating the second cropped image using the second bounding box.

4. The computer-implemented method of claim 3, wherein generating, by a neural network manager, an image embedding for the input image by combining a face embedding corresponding to the first cropped image and a body embedding corresponding to the second cropped image, further comprises:
    generating, by a face model of the neural network manager, the face embedding for the first cropped image; and generating, by a body model of the neural network manager, the body embedding for the second cropped image.

5. The computer-implemented method of claim 4, wherein generating, by a neural network manager, an image embedding for the input image by combining a face embedding corresponding to the first cropped image and a body embedding corresponding to the second cropped image, further comprises:
concatenating the face embedding and the body embedding to generate the image embedding.

6. The computer-implemented method of claim 4, wherein the face model is a neural network trained on a face training image set using contrastive learning which includes minimizing a loss function to maximize agreement of embeddings generated from similar images.

7. The computer-implemented method of claim 4, wherein the body model is a neural network trained on a body training image set using contrastive learning which includes minimizing a loss function to maximize agreement of embeddings generated from similar images.

8. The computer-implemented method of claim 1, wherein querying an image repository in embedding space by comparing the image embedding to a plurality of image embeddings associated with a plurality of images in the image repository to obtain one or more images based on similarity to the input image in the embedding space, further comprises:
calculating a similarity metric between the image embedding and the plurality of image embeddings corresponding to the plurality of images in the image repository; and
returning the one or more images ranked according to the similarity metric.

9. A system comprising:
an image search system comprising:
a user input manager to receive an image query, the image query including an input image that includes a representation of a person;
an object detector to generate a first cropped image including a representation of the person's face and a second cropped image including a representation of the person's body;
a neural network manager to generate an image embedding for the input image by combining a face embedding corresponding to the first cropped image and a body embedding corresponding to the second cropped image; and
a query manager to query an image repository in embedding space by comparing the image embedding to a plurality of image embeddings associated with a plurality of images in the image repository to obtain one or more images based on similarity to the input image in the embedding space.

10. The system of claim 9, wherein to generate a first cropped image including a representation of the person's face and a second cropped image including a representation of the person's body, the object detector is further to:
identify, by a face detector of the object detector, a first bounding box associated with a face of the representation of the person in the input image; and
generate the first cropped image using the first bounding box.

11. The system of claim 10, wherein the object detector is further to:

identify, by a body detector of the object detector, a second bounding box associated with the representation of the person in the input image; and
generate the second cropped image using the second bounding box.

12. The system of claim 11, wherein to generate an image embedding for the input image by combining a face embedding corresponding to the first cropped image and a body embedding corresponding to the second cropped image, the neural network manager is further to:
generate, by a face model of the neural network manager, the face embedding for the first cropped image; and
generate, by a body model of the neural network manager, the body embedding for the second cropped image.

13. The system of claim 12, wherein to generate an image embedding for the input image by combining a face embedding corresponding to the first cropped image and a body embedding corresponding to the second cropped image, the neural network manager is further to:
concatenate the face embedding and the body embedding to generate the image embedding.

14. The system of claim 12, wherein the face model is a neural network trained on a face training image set using contrastive learning which includes minimizing a loss function to maximize agreement of embeddings generated from similar images.

15. The system of claim 12, wherein the body model is a neural network trained on a body training image set using contrastive learning which includes minimizing a loss function to maximize agreement of embeddings generated from similar images.

16. The system of claim 9, wherein to query an image repository in embedding space by comparing the image embedding to a plurality of image embeddings associated with a plurality of images in the image repository to obtain one or more images based on similarity to the input image in the embedding space, the query manager is further to:
calculate a similarity metric between the image embedding and the plurality of image embeddings corresponding to the plurality of images in the image repository; and
return the one or more images ranked according to the similarity metric.

17. A system comprising:
means for receiving an image query, the image query including an input image that includes a representation of a person;
means for generating a first cropped image including a representation of the person's face and a second cropped image including a representation of the person's body;
means for generating an image embedding for the input image by combining a face embedding corresponding to the first cropped image and a body embedding corresponding to the second cropped image; and
means for querying an image repository in embedding space by comparing the image embedding to a plurality of image embeddings associated with a plurality of images in the image repository to obtain one or more images based on similarity to the input image in the embedding space.

18. The system of claim 17, wherein the means for generating a first cropped image including a representation of the person's face and a second cropped image including a representation of the person's body, further comprises:

means for identifying a first bounding box associated with a face of the representation of the person in the input image; and means for generating the first cropped image using the first bounding box.

19. The system of claim 18, further comprising:

means for identifying a second bounding box associated with the representation of the person in the input image; and means for generating the second cropped image using the second bounding box.

20. The system of claim 19, wherein the means for generating an image embedding for the input image by combining a face embedding corresponding to the first cropped image and a body embedding corresponding to the second cropped image, further comprises:

means for generating the face embedding for the first cropped image; and means for generating the body embedding for the second cropped image.

* * * * *